(12) United States Patent
Zahniser

(10) Patent No.: US 8,014,583 B2
(45) Date of Patent: Sep. 6, 2011

(54) METHOD FOR ASSESSING IMAGE FOCUS QUALITY

(75) Inventor: Michael Zahniser, Cambridge, MA (US)

(73) Assignee: Cytyc Corporation, Marlborough, MA (US)

( * ) Notice: Subject to any disclaimer, the term of this patent is extended or adjusted under 35 U.S.C. 154(b) by 0 days.

(21) Appl. No.: 12/767,316

(22) Filed: Apr. 26, 2010

(65) Prior Publication Data

US 2010/0208961 A1   Aug. 19, 2010

Related U.S. Application Data

(62) Division of application No. 11/609,274, filed on Dec. 11, 2006, now Pat. No. 7,769,219.

(51) Int. Cl.
*G06K 9/00* (2006.01)

(52) U.S. Cl. ........ 382/133; 382/255; 382/284; 382/117; 382/131

(58) Field of Classification Search .......................... None
See application file for complete search history.

(56) References Cited

U.S. PATENT DOCUMENTS

| | | | |
|---|---|---|---|
| 5,647,025 A | 7/1997 | Frost et al. | |
| 5,790,710 A * | 8/1998 | Price et al. | 382/255 |
| 6,201,899 B1 | 3/2001 | Bergen | |
| 6,289,113 B1 | 9/2001 | McHugh et al. | |
| 6,416,959 B1 * | 7/2002 | Giuliano et al. | 435/7.2 |
| 6,441,855 B1 | 8/2002 | Omata et al. | |
| 6,573,039 B1 * | 6/2003 | Dunlay et al. | 435/4 |
| 6,640,014 B1 | 10/2003 | Price et al. | |
| 6,671,624 B1 * | 12/2003 | Dunlay et al. | 702/19 |
| 7,006,674 B1 | 2/2006 | Zahniser et al. | |
| 7,067,783 B2 | 6/2006 | Curry et al. | |
| 7,141,773 B2 * | 11/2006 | Kaplan et al. | 250/208.1 |
| 7,369,304 B2 * | 5/2008 | Maenle et al. | 359/368 |
| 7,468,836 B2 | 12/2008 | Maenle et al. | |
| 2003/0118245 A1 | 6/2003 | Yaroslavsky et al. | |
| 2003/0179445 A1 * | 9/2003 | Maenle et al. | 359/368 |
| 2004/0114823 A1 | 6/2004 | Smith et al. | |
| 2005/0047636 A1 | 3/2005 | Gines et al. | |
| 2006/0257050 A1 * | 11/2006 | Obrador | 382/286 |

(Continued)

OTHER PUBLICATIONS

PCT International Search Report and Written Opinion of the International Search Authority for PCT/US2007/085627, Applicant Cytyc Corporation, Forms PCT/ISA/210, 220 and 237, dated Sep. 24, 2008 (18 pages).

(Continued)

*Primary Examiner* — Anand Bhatnagar
*Assistant Examiner* — Tsung-Yin Tsai
(74) *Attorney, Agent, or Firm* — Vista Law Group LLP

(57) ABSTRACT

A method for determining the quality of focus of a digital image of a biological specimen includes obtaining a digital image of a specimen using a specimen imaging apparatus. A measure of image texture is calculated at two different scales, and the measurements are compared to determine how much high-resolution data the image contains compared to low-resolution data. The texture measurement may, for example, be a Brenner auto-focus score calculated from the means of adjacent pairs of pixels for the high-resolution measurement and from the means of adjacent triples of pixels for the low-resolution measurement. A score indicative of the quality of focus is then established based on a function of the low-resolution and high-resolution measurements. This score may be used by an automated imaging device to verify that image quality is acceptable. The device may adjust the focus and acquire new images to replace any that are deemed unacceptable.

9 Claims, 5 Drawing Sheets

U.S. PATENT DOCUMENTS

2007/0014468 A1    1/2007    Gines et al.
2007/0069106 A1*   3/2007    Krief et al. .............. 250/201.3
2008/0266440 A1*  10/2008    Yazdanfar et al. ............ 348/340
2009/0195688 A1*   8/2009    Henderson et al. ........... 348/345

OTHER PUBLICATIONS

PCT Invitation to Pay Additional Fees and Partial Search Report for PCT/US2007/085627, Applicant Cytyc Corp., form PCT/ISA/206, dated Jun. 10, 2008 (9 pages).

Kenny L.C., "Automated Focusing of an Optical Microscope", Journal of Microscopy, Oxford, vol. 132, Pt. 1, Oct. 1, 1983, pp. 97-107 (11 pages).

Yu Song et al., "A New Auto-Focusing Algorithm for Optical Microscope Based Automated System", Control, Automation, Robotics, and Vision, Dec. 1, 2006, ICARCV '06, pp. 1-5 (5 pages).

Bueno-Ibarra et al., "Fast Autofocus Algorithm for Automated Microscopes", Optical Engineering, vol. 44, No. 6, Jun. 30, 2005, pp. 063601-1 to 063601-8 (8 pages).

Yu Sun et al., "Autofocusing Algorithm Selection in Computer Microscopy", Intelligent Robots and Systems, Aug. 2, 2005, pp. 419-425 (7 pages).

Geusebroek et al., "Robust Autofocusing in Microscopy", Cytometry, Alan Liss, New York, vol. 39, No. 1, Feb. 1, 2000, pp. 1-9 (9 pages).

Santos, A., C. Ortiz De Solorzano, J.J. Vaquero, J. M. Pena, N. Malpica and F. Del Pozo, "Evaluation of autofocus functions in molecular cytogenetic analysis", Journal of Microscopy, vol. 188, Pt 3, Dec. 1997, pp. 264-272 (9 pages).

Brenner, John F., Brock S. Dew, J. Brian Horton, Thomas King, Peter W. Neurath and William D. Selles, "An Automated Microscope for Cytologic Research", The Journal of Histochemistry and Cytochemistry, copyright 1976, The Histochemical Society, Inc. vol. 24, No. 1, pp. 100-111 (1976) (12 pages).

* cited by examiner

High Res. score = ((mean(0,1) − mean(2,3))² + ((mean(1,2) − mean(3,4))² + ...

Low Res. score = ((mean(0,1, 2) − mean(3, 4, 5))² + ((mean(1, 2, 3) − mean(4, 5, 6))² + ...

METHOD FOR ASSESSING IMAGE FOCUS QUALITY

RELATED APPLICATION DATA

This application is a divisional of co-pending U.S. patent application Ser. No. 11/609,274, filed Dec. 11, 2006, the priority of which is claimed under 35 U.S.C. §120, and the contents of which are incorporated herein by reference in their entirety, as though set forth in full.

GOVERNMENT RIGHTS

This invention was made with U.S. Government support under NIH Grant Number RR018046 awarded by the National Institutes of Health. The U.S. Government may have certain rights in this invention.

FIELD OF THE INVENTION

The field of the invention generally relates to the field of electronic imaging systems and more particularly to computer-controlled microscopic imaging systems and focusing systems used therein.

BACKGROUND OF THE INVENTION

In the field of pathology, it is often necessary to examine tissue samples for underlying pathological or disease states. In some cases, a sample of tissue or other biological material is embedded within an embedding medium and cut into very thin slices. These slices are then placed on sample holders such as slides for subsequent imaging and analysis. In other applications, cells or other biological material are transferred to slides in a liquid-based preparation. For example, cells may be scraped from a target location (e.g., tissue) and optionally washed in a liquid solution. Alternatively, cells may be obtained directly from a bodily fluid (e.g., urine). The cells may be transferred directly to a slide, for example, blood samples can be smeared directly on a slide. Automated devices have also been developed to obtain and deposit cells on slides. For example, the ThinPrep® System (Cytyc Corporation, Marlborough, Mass.) filters a liquid containing a suspension of cells. A thin layer of accumulated cells on the filter is then transferred onto a slide for subsequent processing and viewing.

Increasingly, automated imaging or scanning systems are employed to capture digital images of the samples. The digital images can then be analyzed by a pathologist or other trained technician for underlying pathological or disease states in the tissue. The automated imaging systems often employ computer-controlled microscopes that use automatically controlled stages and optical components to acquire one or more focused images of the sample. For example, the system may be used to obtain an image of the entire sample that is prepared on the slide. Alternatively (or in combination with), the system may obtain one or more magnified images of certain regions or zones of interest. In order to obtain high-quality images of the sample or magnified regions thereof, the system must be able to rapidly focus on the sample or region.

This requirement poses several technical challenges. Upon viewing an image, human beings can immediately recognize whether it is in focus or out of focus. Computerized systems have difficulty with this task. Given two images of the same object at different focal heights, computer-operated focusing systems are able to identify the image that is better focused. However, given only a single image, it is difficult for computers to automatically assess focus quality. Furthermore, it is difficult for a computer to determine how far the imaged focal plane is from the ideal or optimal focal height.

Many existing methods that evaluate the focus quality of a single image use the Fourier transform. In the absence of noise, a poorly focused image would contain no Fourier signal above a certain frequency. The location of this cutoff frequency would give the scale of the texture. Unfortunately, real images contain noise, and this limits the usefulness of the Fourier transform. Fourier transform-based methods perform poorly on images having low signal-to-noise (SNR) ratios. The Fourier transform methods used are also computationally intensive, requiring robust computational hardware and software.

In automated microscopy, the computer generally finds the optimal focal plane for a given location within a sample by varying the focal height, acquiring an image at each height. A score for each acquired image is calculated using one of various "autofocus functions"; the highest scoring image corresponds to the ideal focal height. Because the value of the autofocus function is dependent on the objects in the field of view, these functions can only be used to judge the quality of one image relative to another image of the same objects, not to make an absolute quality assessment. One class of autofocus functions operates based on image differentiation. Unfocused images usually have only slight differences between pixels that are close to each other, since the point-spread-function (PSF) distributes each pixel intensity among several pixels, blurring them and averaging their grey levels. Different types of image differentiation have been used as a measure of the relative focus quality of an image. For example, Brenner proposed the use of the sum of squared differences between all pixels and their neighbors two points away. See e.g., Brenner et al., *An Automated Microscope For Cytological Research*, J. Histochem. Cytochem. 24, 100-111 (1971). The above-noted publication is incorporated by reference as if set forth fully herein.

The Brenner function has been used as a criterion for focus quality as a computer-controlled imaging system varies the focal height while obtaining an image of a slide. Prior methods compare the Brenner function scores for images acquired at multiple focal heights. Determination of the focus quality for an image depends on comparing the Brenner function score for a field of view at a one focal height to the Brenner function score of the same field of view at a different focal height.

The Brenner function score is a measure of the texture in the image. An in-focus image has a high Brenner function score, and contains texture at a smaller scale than an out-of-focus image. Conversely, an out-of-focus image has a low Brenner function score, and does not contain small-scale texture. As the focal height varies from above the ideal height to below, the Brenner function starts out at a low value, reaches a peak value as the image comes into focus at the ideal focal height, and decreases as focus is lost. The shape of the Brenner function when plotted versus focal height is a bell-shaped curve.

A rather simple auto-focus method could be implemented by initially setting the focal height well above the stage and stepping the imaging optics closer to the sample, in, for example, several micron increments. This process continues until the Brenner score reaches a maximum. Finding the peak focus height requires comparing the Brenner scores of images taken at successive focal heights. However, in many medical imaging applications where large batches of samples must be processed, frequently performing this sort of auto-focus would require far too much time. Ideally, an automated imaging system would acquire only one image of each field of view, but the system must still have some way to ensure image quality. An efficient and accurate method of checking the focus quality of single images would allow such an imaging system to acquire additional auto-focusing images only when it determines that the focus quality of a given image is unacceptable, maximizing efficiency without introducing a risk of reduced accuracy.

SUMMARY

In one embodiment, a method for determining the quality of focus of a digital image of a biological specimen includes obtaining a digital image of the specimen using the specimen imaging apparatus. The digital image comprises a plurality of pixels. A measure of small-scale texture in the image is calculated. For example, the small-scale texture in the image may be measured by squaring the differences of the means of adjacent pairs of pixels across the entire digital image. Next, a measure of larger-scale texture in the image is calculated. The larger-scale texture may be measured by squaring the differences of the means of adjacent triples of pixels across the entire digital image. An estimate of the image focus quality is then established based on a comparison of the small-scale and larger-scale texture measurements.

In one embodiment, a method for determining the quality of focus of a digital image of a biological specimen includes the steps of obtaining a digital image of a specimen using a specimen imaging apparatus, the digital image comprising a plurality of pixels. A high-resolution Brenner score is calculated by squaring the difference of the means of neighboring pairs of pixels and summing the squared differences over a set of pixels within the digital image. A low-resolution Brenner score is calculated by squaring the difference of the means of neighboring triples of pixels and summing the squared differences over a set of pixels within the digital image. A ratio of either the high-resolution Brenner score divided by the low-resolution Brenner score or the low-resolution Brenner score divided by the high-resolution Brenner score is then calculated. As used herein, ratio may be used to refer to dividing a high-resolution texture score by a low-resolution texture score or, alternatively, dividing a low-resolution texture score by a high-resolution texture score. A focus score indicative of the focus quality is then established based on the calculated ratio. The focus score may include, for instance, an estimated displacement from the ideal focal height.

In another aspect of the invention a method of focusing a specimen imaging apparatus includes the steps of obtaining a digital image of a specimen using the specimen imaging apparatus, the digital image comprising a plurality of pixels. A high-resolution Brenner score is calculated by squaring the difference of the means of neighboring pairs of pixels and summing the squared differences over a set of pixels within the digital image. A low-resolution Brenner score is calculated by squaring the difference of the means of neighboring triples of pixels and summing the squared differences over a set of pixels within the digital image. The ratio of the high-resolution Brenner score to the low-resolution Brenner score is calculated. The focal length of the specimen imaging apparatus is then adjusted based on the ratio.

The focusing method may include the additional step of acquiring one or more digital images of the specimen and re-calculating the Brenner score or Brenner ratio to assess the improvement in focus. Additional digital images may be obtained and analyzed until the focal plane is at or near the optimal or true focus height. Because the Brenner score as a function of focal height is a bell-shaped curve (an exponentiated quadratic function), the location of its peak can be estimated from three or more points using inverse parabolic interpolation on the logarithms of the focus scores.

In still another aspect of the invention, a method of performing a quality check on a digital image of a specimen contained on a specimen holder includes the steps of obtaining a digital image of a specimen, the digital image comprising a plurality of pixels. A high-resolution Brenner score is calculated by squaring the difference of the means of neighboring pairs of pixels and summing the squared differences over a set of pixels within the digital image. A low-resolution Brenner score is calculated by squaring the difference of the means of neighboring triples of pixels and summing the squared differences over a set of pixels within the digital image. Next, the ratio of the low-resolution Brenner score to the high-resolution Brenner score is calculated. The digital image is either accepted or rejected based on the calculated ratio. An automated imaging system may either immediately adjust the focus and acquire new images when focus quality is determined to be unsatisfactory, or may continue imaging but reprocess an entire sample if the number of poorly focused images crosses a given threshold.

In another aspect of the invention, a method of focusing on a specimen using an automatic imaging apparatus includes the steps of obtaining three digital images of the specimen at different focal heights using the imaging apparatus. The digital image is formed from a plurality of pixels. A Brenner auto-focus score is calculated for each of the three digital images. An exponentiated quadratic function is fit to the (x, y) points formed by the three focal heights and the corresponding Brenner scores. A new image is acquired at a new focal height based on the function fitted to the data. A new Brenner score is calculated for the new image. Additional images are acquired the different new (e.g., modified) focal heights until the ideal focal height is reached. Of course, the process may stop when the imaging apparatus senses that it is within close proximity to the ideal focal height (e.g., +/−a displacement value).

BRIEF DESCRIPTION OF THE DRAWINGS

Embodiments of the invention will now be described and explained with additional specificity and detail through the use of accompanying drawings, in which.

DETAILED DESCRIPTION OF THE ILLUSTRATED EMBODIMENTS

Figure 1:
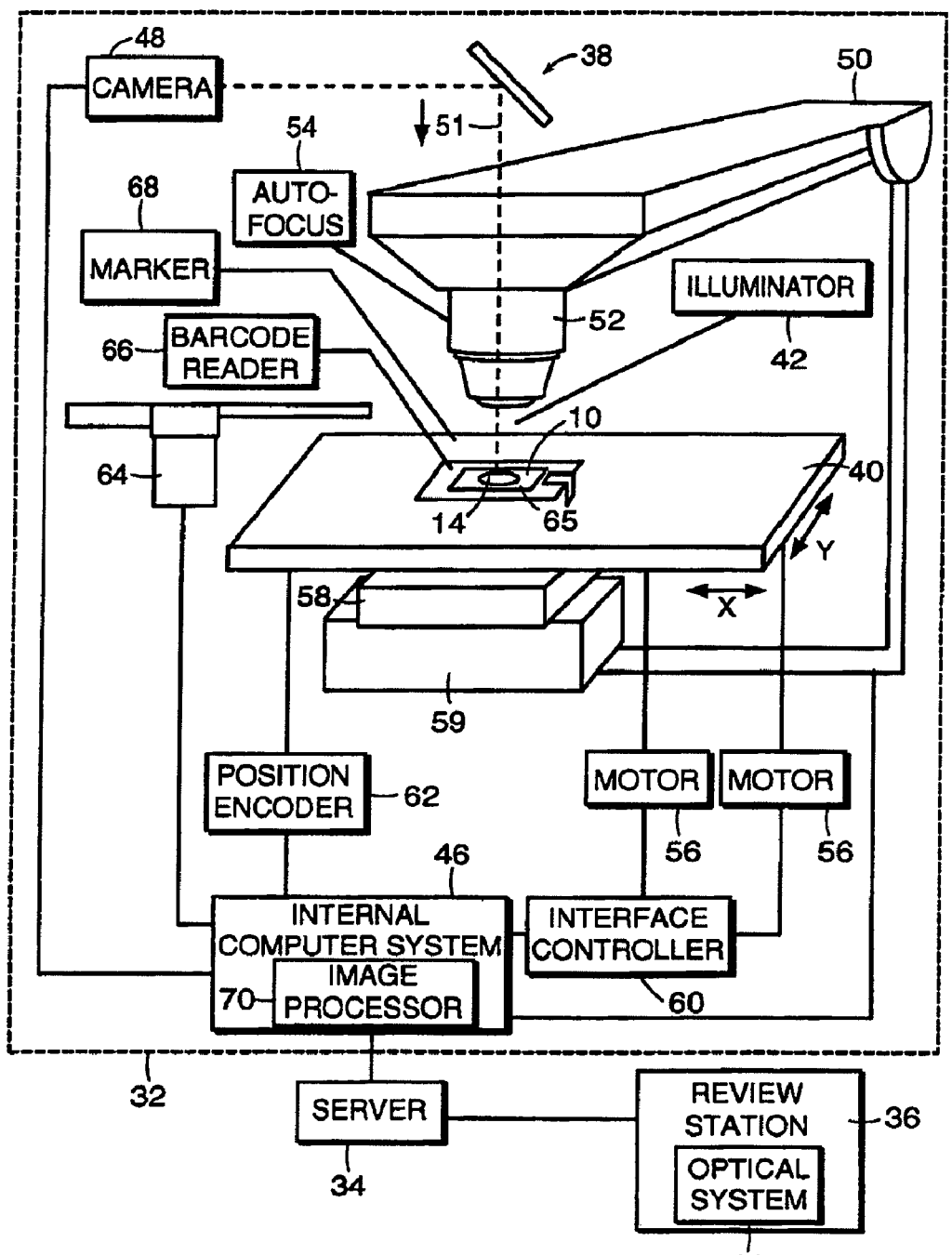
FIG. 1 schematically illustrates an exemplary specimen imaging apparatus.

FIG. 1 illustrates an exemplary specimen imaging apparatus 32 of the present invention. The image processing apparatus 32 includes a first optical system 38, and a slide stage 40 movable relative thereto. A review station 36 is provided and includes a second optical system 44, and is connected to the image processing system 32 via the server 34. An internal computer system 46 controls the first optical system 38 and is in communication with the server 34.

The first optical system 38 includes an electronic camera 48, such as a CCD camera 48, and a microscope 50. The microscope 50 is preferably an automated microscope. The automated microscope 50 may include features to provide fast, precise imaging of an area of a slide 10 positioned in the optical path 51 of the microscope 50, such as an autofocusing mechanism 54. The first optical system 38 may include one or more lens systems 52. An illuminator 42 may provide illumination for the specimen 14 deposited on the slide 10 and generally may illuminate the slide 10 from below the stage 40.

The stage 40 transports the specimen slide 10 into and within the optical path 51 of the microscope 50, in response to appropriate commands from the internal computer system 46. In one embodiment, a robotic slide handler 64 may, upon appropriate commands from the computer system 46, move the specimen slide 10 from a slide-holding cassette to the movable stage 40 for imaging the cells in the specimen, and then back to the cassette after imaging. A slide holder 65 fixedly and removably positions a slide 10 repeatedly in a precise location and orientation on the stage 40. The stage 40 may be motorized, and powered by one or more stage motors 56. The stage 40 may be mounted upon bearings 58, which in turn are mounted to the base 59 of the microscope 50. In one embodiment, the stage 40 is movable in an x-y plane.

In one embodiment, an interface controller 60 in communication with the movable stage 40 may provide precise controlled movements of the slide 10 relative to the optical path 51 and viewing area of the microscope 50. The interface controller 60 controls the stage motors 56 by converting commands from the computer system 46 into appropriate signals that cause the motors 56 to move the stage 40 to prescribed locations. A position encoder 62 may detect the precise location of the stage 40, producing to the computer system 46 pulses representative of the movement or location of the stage. As known in the art, these pulses may be decoded by the computer system 46 in order to identify the location of the stage 40 in an imaging station coordinate system.

The image processing system 32 may include an optional bar code reader 66 positioned to view the area of a slide containing a bar code, once the slide 10 has been transported to the movable stage 40 by the robotic slide handler 64 or has been loaded manually. The image processing system 32 may include a marker 68 that automatically places a dot, a mark, or other visible sign in the areas of interest within the specimen where potentially abnormal cells may be located.

The review station 36 is connected to the image processing system 32 via the server 34, and may be remotely located. The review station 36 includes a second optical system 44. The second optical system 44 may include any and all features of the first optical system 38. In one embodiment, the second optical system 44 includes a microscope 50 that is connected to a movable stage and that is adapted for use by a human operator for visual inspection of the areas of interest identified by the image processing system 32.

In operation, the image processing system 32 performs an initial viewing and screening of a slide 10 on which a cytological specimen 14 is disposed, in order to make a preliminary assessment of the specimen 14. The image processing system 32 identifies for subsequent viewing by a cytotechnologist or pathologist the locations of those areas of interest on the slide that potentially are most relevant. In order to prevent false negative readings in a Pap smear screen, the locations of areas that are identified by the image processing system 32 in this preliminary screening must be accurate to within an acceptable error margin. Incorrect handling or positioning of the slides during the scanning process may cause errors in the locations of the identified areas and subsequent misreading at the review station 36.

Additional details regarding the operation of the image processing system 32 may be found in U.S. Pat. No. 7,006,674, which is incorporated by reference as if set forth fully herein. Of course, the methods described herein may be used with other image processing systems that are used to image biological specimens.

Figure 2A:
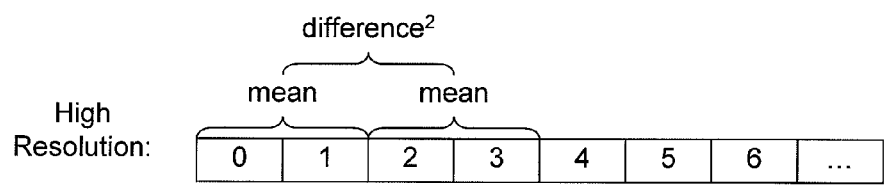
FIG. 2A is a graphical representation of the calculation of the Brenner score for a small scale texture (e.g., blocks of two pixels).
Figure 2B:
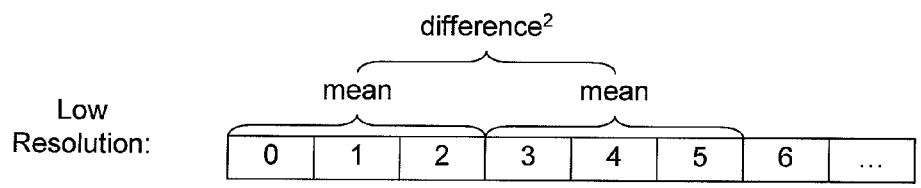
FIG. 2B is a graphical representation of the calculation of the Brenner score for a larger scale texture (e.g., three blocks of pixels).

In one aspect of the invention, a method is provided for determining the focus quality of a digital image obtained using the image processing system 32. The method involves first obtaining a digital image of a specimen 14. The digital image may be acquired using a camera 48. The digital image of the specimen 14 is formed by an array of pixels 100. FIGS. 2A and 2B illustrate a portion of adjacent pixels 100 within the digital image. Each pixel 100 within the image may be represented by an 8-bit (e.g., byte) number that represents the intensity or brightness for that particular pixel. Each pixel's value may be linearly proportional to the number of photons that struck the corresponding bin of the camera 48 when the shutter was opened. For example, in an eight-bit system, each pixel 100 may be assigned one of 256 potential values representing the pixel's brightness or intensity. In this regard, the imaging system analyzes 8-bit grayscale images. According to one aspect of the invention, high-resolution texture of the digital image is obtained by calculating a high-resolution Brenner score ($BR_{HR}$). The high-resolution Brenner score is calculated by squaring the difference of the means of neighboring pairs of pixels and summing the squared differences over a set of pixels 100 within the digital image. The high-resolution Brenner score may be calculated using Equation 1, where rows and cols are the number of rows and columns of pixels in the image and $P_{i,j}$ is the value of the pixel in row 1 and column j. This equation is set forth visually illustrated in FIG. 2A.

$$BR_{HR} = \sum_{i=1}^{rows} \sum_{j=1}^{cols-3} \left( \frac{\text{mean}(P_{i,j}, P_{i,j+1}) -}{\text{mean}(P_{i,j+2}, P_{i,j+3})} \right)^2 \quad \text{(Eq. 1)}$$

In addition to a high-resolution texture of the digital image, a low-resolution texture of the image is obtained by calculating a low-resolution Brenner score ($BR_{LR}$). The low-resolution Brenner score is calculated by squaring the difference of the means of neighboring triples of pixels and summing the squared differences over a set of pixels within the digital image. The low-resolution Brenner score may be calculated using Equation 2 set forth below and also visually illustrated in FIG. 2B:

$$BR_{HR} = \sum_{i=1}^{rows} \sum_{j=1}^{cols-5} \left( \frac{\text{mean}(P_{i,j}, P_{i,j+1}, P_{i,j+2}) -}{\text{mean}(P_{i,j+3}, P_{i,j+4}, P_{i,j+5})} \right)^2 \quad \text{(Eq. 2)}$$

The low-solution Brenner score is obtained by increasing the width of the averaging window from two pixels to three pixels. The wider averaging window effectively reduces the resolution of the image.

In one aspect of the invention, the quality of focus of a digital image is estimated by comparing the high-resolution Brenner score and the low-resolution Brenner score. For example, the high-resolution score can be divided by the low-resolution score ($BR_{HR}/BR_{LR}$). Alternatively, the low-resolution score can be divided by the high-resolution score ($BR_{LR}/BR_{HR}$). The score calculation and comparison may be done by the internal computer system 46 or by some other computer device operatively connected to the specimen imaging apparatus 32.

Based on the calculated ratio, a focus score is then established. In one aspect of the invention, the focus score is obtained using experimentally derived data that relates the degree of displacement from optimal or true focus as a function of the ratio of the high-resolution Brenner score to the low-resolution Brenner score. The best fit function is calculated for this data. The inverse of this function can then be used to map measured ratios to estimated displacements. For example, a ratio of 0.45 ($BR_{HR}/BR_{LR}$) may correspond to a focus score that indicates that the focus of the imaging apparatus 32 is +/−12.5 μm from true focus. The focus score may be an actual displacement value (i.e., distance). Alternatively, the focus score may be a percentage value.

Figure 3:
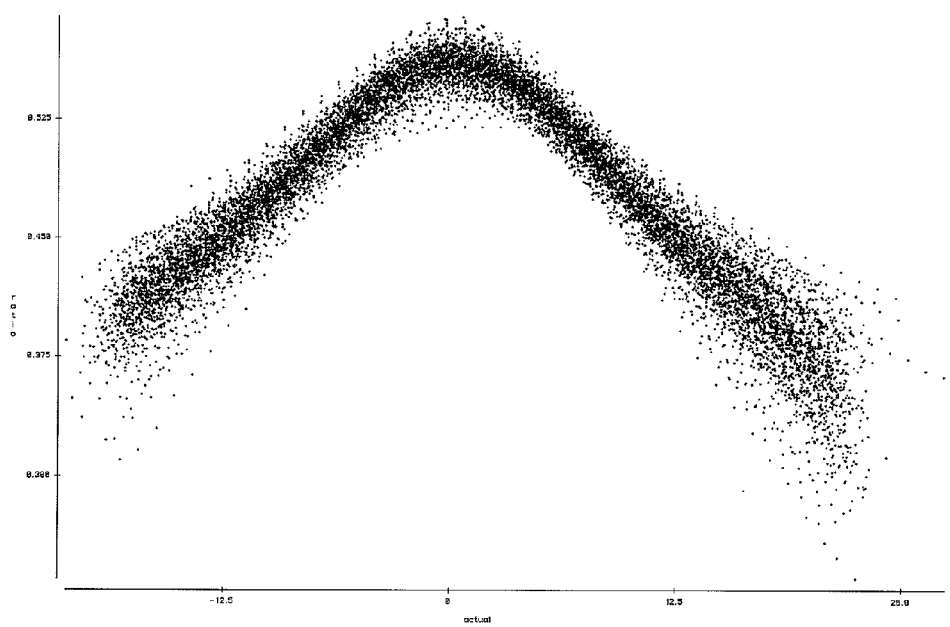
FIG. 3 is a scatter plot of the ratio of small scale (high-resolution) Brenner score to larger scale (low-resolution) Brenner score as a function of displacement from the ideal focal height. The scatter plot data was obtained from 12,000 images taken across a test set of thirty slides.

A set of digital images was experimentally obtained at various focal heights at different locations on different slides. Some 12,000 images were taken at forty different focal heights. The images were taken at ten different locations on thirty different slides. The ratio of the high-resolution Brenner score to the low-resolution Brenner score was then determined. FIG. 3 is a scatter plot of the ratio for each of the 12,000 images plotted as a function of the displacement from the ideal focus. The y-axis of the graph in FIG. 3 represents ($BR_{HR}/BR_{LR}$) while the x-axis of the graph illustrates the degree of displacement from optical focus (expressed both as positive and negative displacement). As seen in FIG. 3, the data naturally form a bell-shaped curve with the peak of the curve corresponding to the optimal focal height. As seen in the scatter plot, the ratio was consistent across different slides, despite wide variation in the number and type of objects at each location. The Brenner ratio (high-resolution/low-resolution and low-resolution/high-resolution) thus provides a relatively constant metric to measure the quality of focus for images taken from different slides.

The equation that most closely fits the data shown in FIG. 3 is a bell curve. Equation 3 gives the equation for a bell curve centered on the y axis, where parameters a and c control the width and height of the peak and d is the displacement from the ideal focal height:

$$\text{ratio} \approx e^{a \cdot d^2 + c} \quad \text{(Eq. 3)}$$

For the data shown in FIG. 3, the parameters a and c resulting in the best fit are a=−0.0015459 and c=−0.58835. The parameters can be determined by minimizing the sum of squared errors between the actual ratio and the ratio predicted from the displacement using Equation 3. Let y be equal to the natural logarithm of the measured ratio ($BR_{HR}/BR_{LR}$), and let $\hat{y}$ be the natural logarithm of the predicted ratio:

$$y = \ln(BR_{HR}/BR_{LR})$$

$$\hat{y} = \ln(e^{a \cdot d^2 + c}) = a \cdot d^2 + c \quad \text{(Eq. 4-5)}$$

For each image in the sample set, a value for y and $\hat{y}$ can be calculated. For the $i^{th}$ image, let $y_i$ and $\hat{y}_i$ be the corresponding values and $d_i$ be the displacement of that image. The ideal values of parameters a and c are those which minimize the sum of squared errors across all images in the sample set:

$$\text{error} = \sum_i (\hat{y}_i - y_i) = \sum_i ((a \cdot d_i^2 + c) - y_i) \quad \text{(Eq. 6)}$$

Values for a and c can be determined by setting the partial derivatives with respect to a and c to zero:

$$\frac{\partial}{\partial a} : 0 = \sum_i d_i^2 (a d_i^2 + c - y_i) \quad \text{(Eq. 7)}$$

$$= a \sum_i d_i^4 + c \sum_i d_i^2 - \sum_i d_i^2 y_i$$

$$\frac{\partial}{\partial c} : 0 = \sum_i (a d_i^2 + c - y_i)$$

$$= a \sum_i d_i^2 + c \sum_i 1 - \sum_i y_i$$

This system of equations is easily solved by converting it to matrix form:

$$0 = \begin{bmatrix} \sum_i d_i^4 & \sum_i d_i^2 \\ \sum_i d_i^2 & \sum_i 1 \end{bmatrix} \cdot \begin{bmatrix} a \\ c \end{bmatrix} - \begin{bmatrix} \sum_i d_i^2 y_i \\ \sum_i y_i \end{bmatrix} \quad \text{Eq. 8}$$

Which then yields, for the data in FIG. 3, a=−0.0015459 and c=−0.58835.

The predicted displacement from ideal focus as a function of the high/low Brenner ratio can then be expressed as:

$$\text{predictedDisplacement} = \pm \sqrt{(\ln(BR_{HR}/BR_{LR}) - c)/a} \quad \text{Eq. 9}$$

Figure 4:
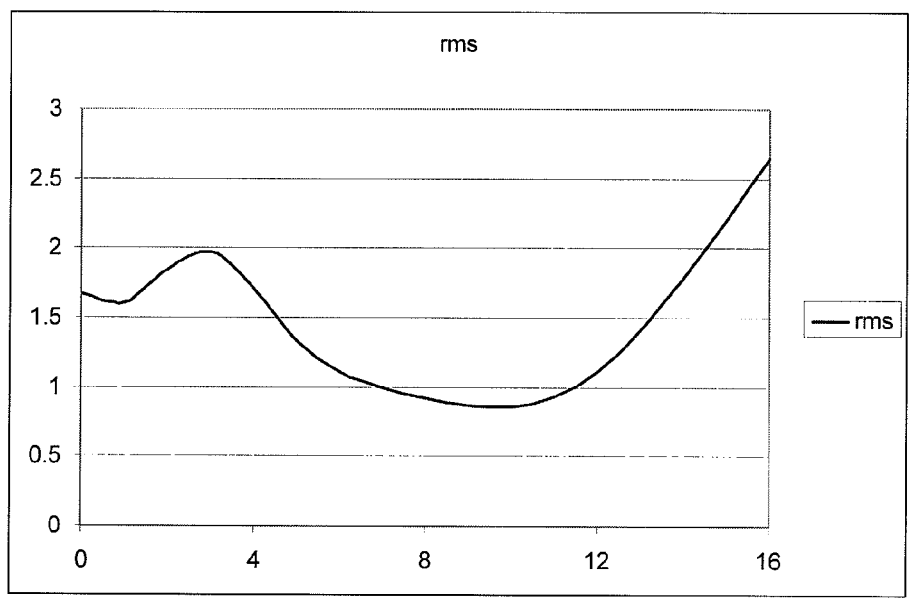
FIG. 4 is a graph illustrating the root mean squared error of the predicted displacement compared to actual displacement for the 12,000 images of FIG. 3.

Imaginary predicated displacements in this equation can be mapped to zero. FIG. 4 illustrates the root mean squared (RMS) error of the predicted displacement using Eq. 9 as compared to the actual displacement values for the 12,000 images. RMS values are shown on the y-axis while displacement is illustrated on the x-axis. As can be seen in FIG. 4, at displacements of less than 5 μm there is little visual effect and deviations are hard to discern. However, between about 5 μm and 12 μm the error is near or below 1 μm. Deviations become larger above 12 μm. This can also be seen from FIG. 3 which shows significant scatter of the data points above this limit.

It is thus possible to determine the quality of focus from a single digital image. By calculating the $BR_{HR}/BR_{LR}$ ratio (or low-res to high-res ratio), the displacement from ideal focus can then be determined. The displacement from the ideal focal height may be estimated from a certain ratio based on a model formula like Equation 3 above. It should be noted that a given ratio provides two possible displacement values—one positive and one negative.

The focus score or reading obtained in the above manner may be used in a number of ways. First, the method may be used to determine whether a single digital image is accepted or rejected. For example, if the displacement falls outside a pre-determined threshold value, then the image may be rejected. This may mean that a new image must be acquired from the same location, at a different focal height. The focus score may be obtained for images from a plurality of specimens loaded into the specimen imaging apparatus 32. For example, the average of the focus scores of all the images from a given slide may be measured, or their standard deviation. Alternatively the number of images for a given slide that scored above a certain threshold could be measured. Particular slides within a batch may then be reprocessed if their focus scores are found to be unacceptable. Alternatively, a rolling or cumulative score may be given to multiple slides within a batch. If the rolling or cumulative score crosses a pre-determined threshold then those slides may be deemed suspect and, consequently, may need to be rescanned. The threshold may be a preset displacement value, a standard deviation value, a percentage, or other metric.

In one aspect of the invention, an automated imaging device may track the number of images from a given slide that fall outside a given range of acceptable scores. If the number of images failing these criteria is above a certain number, the slide may be reprocessed. For instance, an imaging device might reprocess any slide for which more than 100 of the 2000 images acquired from the slide fall outside the acceptable range. Alternatively, individual slides or batches of slides may be flagged if their respective focus scores go beyond a pre-determined threshold value or range. The user can then accept the slides or opt to run them again through the specimen imaging apparatus 32. In another aspect of the invention, the specimen imaging apparatus may attempt to recalibrate itself or inform the user that maintenance is required if more than a certain percentage of slides are rejected in this manner.

In another aspect of the invention, an automated imaging device may calculate the Brenner ratio score for each image acquired and acquire a new image at the same location whenever the score is unacceptable. The device may move back to that location immediately when it discovers the error, or it may remember all locations where the image was unacceptable and return to those locations to acquire new images after the rest of the slide has been scanned.

In another aspect of the invention, an automated imaging device may recognize a trend in the ratio scores and attempt to correct future focus movements based on that trend. For example, if all images are estimated to have a displacement of 4 μm, the device may acquire the next image at a height of 1 μm above where it otherwise would have. If the estimated displacement of the next image is reduced, the device may continue increasing the height offset in increments of 1 μm until doing so no longer increases the focus quality. If instead the estimated displacement of the next image is greater, the device may increment the offset in the opposite direction.

It is common practice in automated imaging to search for the ideal focal height by varying the height in fixed intervals or in a binary search pattern and comparing the autofocus scores at each height. In one aspect of the invention, this process is made more efficient and accurate by fitting a curve to the autofocus scores and adjusting the focal height based on that curve. Multiple digital images are acquired with each digital image being acquired at a different focal height. A Brenner score is then calculated for each image and a function (e.g., curve) is generated that fits the scores and allows the peak of the Brenner function (the optimal or ideal focal height) to be estimated. The focal length can then be adjusted using the generated curve for the data.

In another aspect of the invention, a digital image of the specimen 14 is acquired. Next, a high-resolution Brenner score is calculated by squaring the difference of the means of neighboring pairs of pixels and summing the squared differences over a set of pixels 100 within the digital image. A low-resolution Brenner score is calculated by squaring the difference of the means of neighboring triples of pixels and summing the squared differences over a set of pixels within the digital image. A ratio is then calculated by dividing the high-resolution Brenner score by the low-resolution Brenner score. Alternatively, the ratio is calculated by dividing the low-resolution Brenner score by the high-resolution Brenner score. Based on one of the aforementioned ratios, the focal length is then adjusted. The degree of adjustment is determined by experimental data or through a modeling equation like Equation 3 that relates the ratio to the degree of displacement from optimal focus.

Because for any given ratio, there are two displacement values (one positive and one negative), the specimen imaging apparatus 32 may randomly pick one of the two options and move accordingly. A second (or additional) image may then be obtained to check whether the optimal focus has been reached. Alternatively, the system may be set such that the initial image is predicted to be on one, known side of the focal plane. For example, the initial image may be taken at a position such that it is reasonable to estimate that the sample needs to move closer to the optics. In this regard, the system can make a second adjustment or additional adjustments to decrease the focal length to reach the optical focal position.

The computer system 46 of the specimen imaging apparatus 32 may include a look-up table or database that includes displacement values as a function of the calculated ratio. In this regard, a quick determination can be made regarding the estimated displacement from true focus. Once the estimated displacement value is obtained from the database or look-up table, the specimen 14 (via the moveable stage 40) can be moved toward or further away from the device optics. Alternatively, the coefficients for an equation such as Equation 9 can be calculated based on a data set and the inverse of the equation may be used to predict displacement as a function of the calculated ratio.

Once the specimen 14 (and/or optics) is moved to adjust to the predicted correct focal plane, another image of the specimen may be obtained via the specimen imaging apparatus 32. The second image may be used to confirm whether or not the new position is at or close enough to the optical focal position. This can be determined by again calculating the Brenner score or ratio as described herein. For example, if the second, new position is still some distance away from the optimal focal position, the specimen 14 and/or optics may be moved a certain amount (i.e., displacement) as directed by the new score or ratio. This process may be repeated any number of times until the device 32 has reached the optimal (or near-optimal) focal plane.

Figure 5:
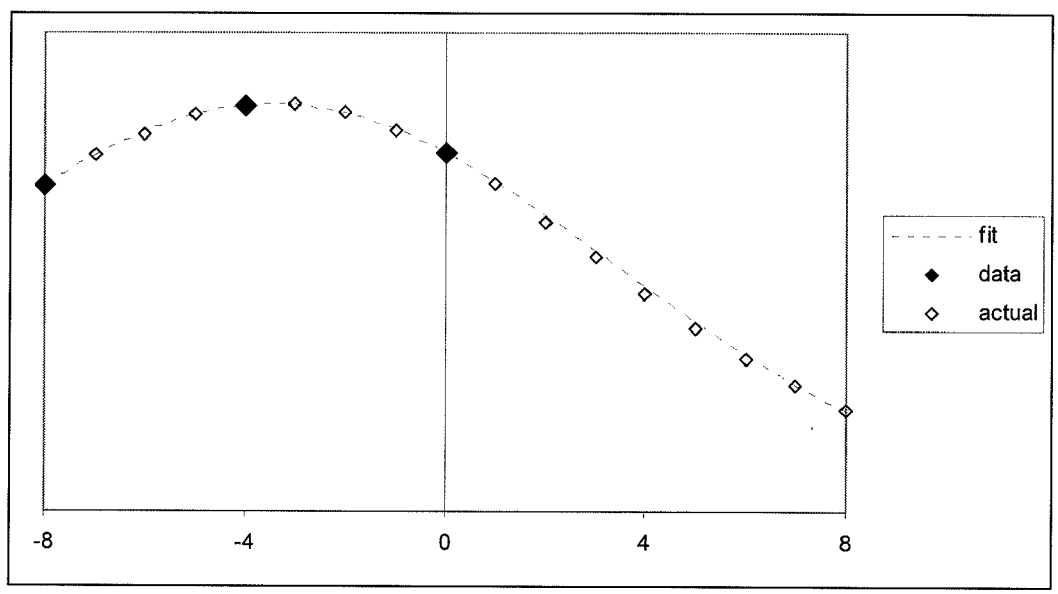
FIG. 5 is a graph illustrating Brenner scores obtained at offsets of 0, −4, and −8 microns from initial height (solid data points). The dotted line is a best fit calculated using only the three data points. The hollow data points represent additional Brenner scores obtained at one micron incremental movements.

In one aspect of the invention, a device which uses the standard autofocusing method of acquiring multiple images at different focal heights can be modified to fit a bell curve equation to the scores from these multiple images and to interpolate the peak of the bell curve from the data. Using this method, data points can be gathered at relatively larger offsets (e.g., 4 μm) but the ideal focal height can be estimated with a much finer resolution. FIG. 5 illustrates a graph of the Brenner score (y-axis) as a function of displacement. The three solid diamonds represent data points gathered using stepping increments of 4 μm. The dashed line represents a best fit using the three (solid diamond) data points. The best fit is a bell-shaped curve that can be modeled or approximated using an exponential function like that of Equation 3. Given a fit to the focus scores for the same field at multiple heights, the peak (or optical focal position) of the focus score curve can be found.

This gives an estimate with finer resolution than the step height between individual frames. FIG. 5 also illustrates, with hollow diamonds, actual data obtained by stepping focal plane in small, 1 µm. As seen in FIG. 5, the best fit curve shows near-perfect alignment with the data obtained from the 1 µm stepwise adjustment of the focal plane. This shows that estimating the peak from the widely spaced filled points will result in as much of an accuracy improvement as would be gained by acquiring more images at smaller intervals, but without the additional time that would be needed to acquire these images.

By estimating the peak of the bell-shaped curve using a best curve fit of multiple data points, the speed and accuracy of focusing operations in specimen imaging devices can be increased. Rather than moving in fixed increments or in a binary search for the best focal height, the focusing algorithm can fit a curve to the existing set of points and then acquire the next image at the estimated peak of the curve, allowing it to more quickly converge on the peak.

The embodiments describe the use of the Brenner score to calculate and measure small-scale and larger-scale texture in digital images. It should be understood, however, that other autofocus scoring methods known to those skilled in the art may also be employed to quantify small-scale and larger-scale texture resolutions. While embodiments of the present invention have been shown and described, various modifications may be made without departing from the scope of the present invention. The invention, therefore, should not be limited, except to the following claims, and their equivalents.

What is claimed is:

1. A method of focusing on a specimen using an automatic imaging apparatus, the method comprising:
    (a) obtaining three digital images of the specimen at different focal heights using the imaging apparatus, the digital image comprising a plurality of pixels;
    (b) calculating a Brenner auto-focus score for each of the three digital images;
    (c) fitting an exponentiated quadratic function to the (x, y) points formed by the three focal heights and the corresponding image Brenner scores;
    (d) moving to a new focal height based on the function of step (c), acquiring a new image, and calculating the Brenner score for the new image, and
    (e) repeating step (d) until an ideal focal height is reached.

2. The method of claim 1, wherein each new image is acquired at the peak of the fit function calculated from the previous data points.

3. The method of claim 2, wherein the ideal focal height is reached when fit function height, estimated when incorporating the newest data point into the fit, is within a certain threshold of the previous function height estimate.

4. The method of claim 1, wherein the fit function is calculated using only three data points:
    (a) The data point with the highest score found so far;
    (b) The data point with the focal height that is closest to point (a), but below it; and
    (c) The data point with the focal height that is closest to point (a), but above it.

5. The method of claim 4, wherein with each step the focal height is adjusted to the height which is as close as possible to the peak of the fit function while remaining at least a certain distance away from all focal heights checked so far.

6. The method of claim 4, wherein the ideal focal height is reached when the three points used in the fit are all within a certain distance of each other.

7. A method of focusing a specimen imaging apparatus comprising:
    (a) obtaining a digital image of a specimen using the specimen imaging apparatus, the digital image comprising a plurality of pixels;
    (b) calculating a high-resolution Brenner score by squaring the difference of the means of neighboring pairs of pixels and summing the squared differences over a set of pixels within the digital image;
    (c) calculating a low-resolution Brenner score by squaring the difference of the means of neighboring triples of pixels and summing the squared differences over a set of pixels within the digital image;
    (d) calculating a ratio comprising the high-resolution Brenner score divided by the low-resolution Brenner score; and
    (e) adjusting the focal length of the specimen imaging apparatus based on the ratio.

8. The method of claim 7, further comprising the step of obtaining a digital image of the specimen at the adjusted focal length and repeating steps (b) through (e).

9. The method of claim 8, wherein the steps (b) through (e) are repeated a plurality of times with different images at the adjusted focal length.

* * * * *